United States Patent [19]

Comer

[11] 3,734,229
[45] May 22, 1973

[54] VEHICLE CONTROL SYSTEM
[75] Inventor: Donald T. Comer, Los Gatos, Calif.
[73] Assignee: Mobility Systems, Inc., Santa Clara, Calif.
[22] Filed: Apr. 11, 1969
[21] Appl. No.: 815,467

[52] U.S. Cl. .......................... 180/98, 340/32, 246/8
[51] Int. Cl. .............................................. B62d 5/04
[58] Field of Search ................... 340/32; 325/26, 28, 325/23, 117, 312, 314; 180/98; 246/2-5, 8

[56] References Cited

UNITED STATES PATENTS

| | | | |
|---|---|---|---|
| 2,255,055 | 9/1941 | Halstead | 340/32 |
| 2,429,607 | 10/1947 | Capen | 340/32 |
| 2,661,070 | 12/1953 | Ferrill | 340/195 |
| 2,980,793 | 4/1961 | Daniel | 340/32 |
| 3,105,119 | 9/1963 | Cory | 340/32 |
| 3,147,817 | 9/1964 | Deliban | 180/98 |
| 3,512,601 | 5/1970 | Wilson | 180/98 |
| 3,610,363 | 10/1971 | Hartley | 180/98 |

*Primary Examiner*—Kenneth H. Betts
*Attorney*—Lowhurst & Hamrick

[57] ABSTRACT

A vehicle control system for supplying vehicle control data or other communicative data to a plurality of vehicles which are constrained to transit a predetermined network of travel paths. An array of twin lead conductors are disposed beneath the surface of the travel paths and form a distributed antenna network. Vehicles passing along the transit paths are equipped with transmitting apparatus which uses the antenna network as a communicative medium for providing two way communication between a stationary control unit and the vehicle carried mobile control units. An array of single conductors is also disposed along the travel paths and are energized with a low frequency AC signal for developing magnetic fields which are detected by a vehicle carried guidance control unit for guiding the vehicle along a particular path.

4 Claims, 3 Drawing Figures

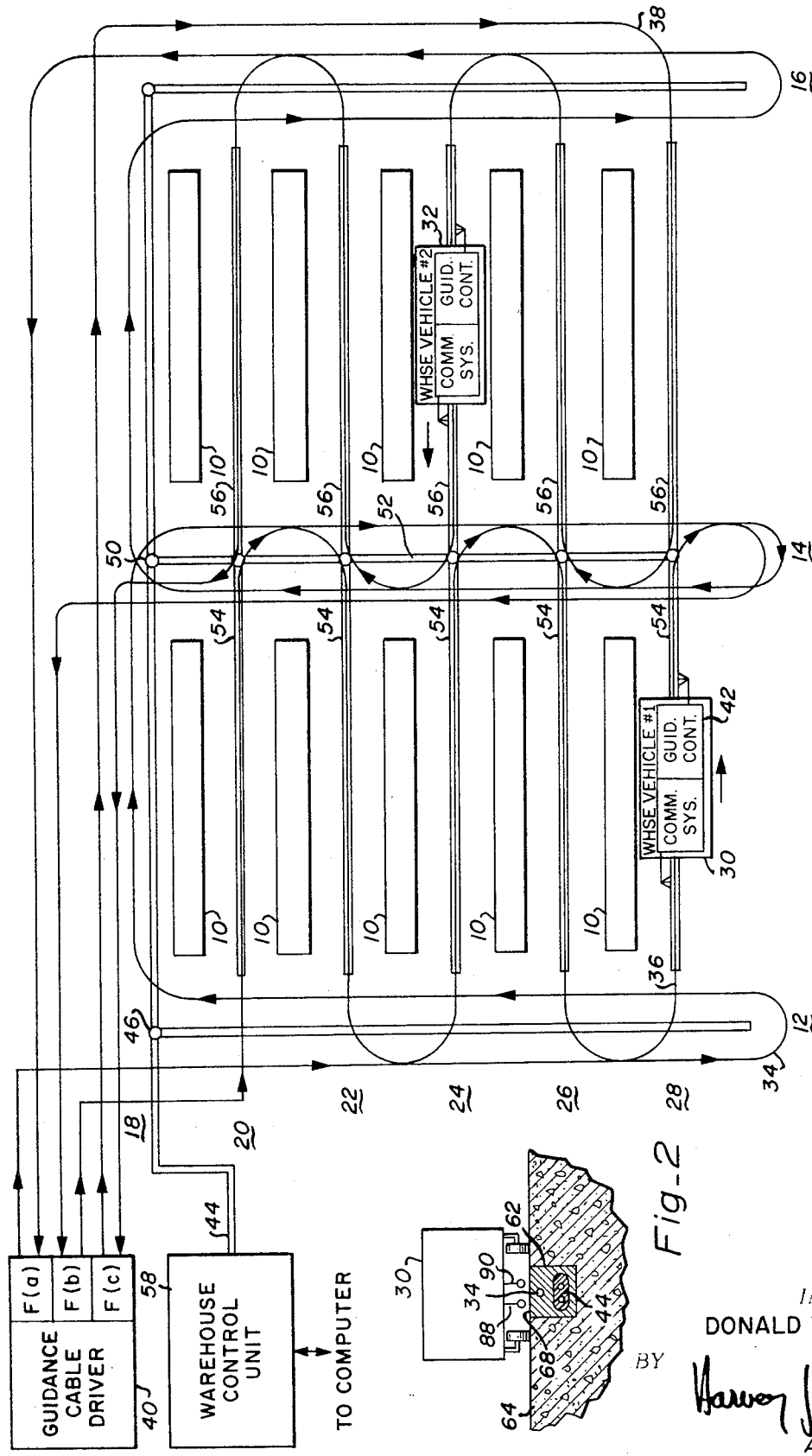

3,734,229

VEHICLE CONTROL SYSTEM

BACKGROUND OF THE INVENTION

Field of the Invention

The present invention relates generally to vehicle control systems and more particularly to a system using magnetic energy to guide, and electro-magnetic energy to communicate with one or more vehicles which are caused to transit a network of travel paths.

Systems for providing communication between a moving vehicle and a base station have long been known in the prior art. Now in widespread use are the systems wherein a transceiver is carried on board a vehicle for enabling communication with a base station, relay station or other vehicle similarly equipped, via radio waves passed through the atmosphere. These systems have now been perfected to the point of near ideal utility for most types of communicative uses except where large metallic obstacles may provide substantial interference with the path of communication.

In applications where there are physical impedances to the communication path, or the distance over which the communication is to be practiced exceeds the practical or authorized range, a given transmitting station, a plurality of relaying stations (and/or receivers) may be suitably spaced apart to circumvent the obstruction or extend the communication path. In railroad communication systems, for example, a plurality of relay stations may be spaced along a given railway route to facilitate the transmission of data or voice communication between one or more trains and one or more base stations.

Communication systems of this type have also been used for guidance purposes to control unmanned vehicles, but have suffered from a general lack of dependability in environments where the path of transmission is or may be interfered with by radio impervious or radio reflective structures either natural or man-made. It has been found impractical, for example, in the case of remote controlled warehouse vehicles to attempt to transmit radio control information to a receiver on board a warehouse vehicle from a central antenna structure mounted near the roof of the warehouse because of the interferences produced by the building superstructure as well as metallic bins and other obstructions within the warehouse.

Modern warehousing principles now demand that a practical intercommunication system be provided for transmitting computerized control data to and from a warehouse vehicle with complete reliability. Such a system is a necessary corequisite to the practical application of automated vehicle guidance systems which are now being used in the warehousing industry. A guidance system wherein one or more warehousing vehicles can be controlled to follow predetermined transit paths is disclosed in the copending U.S. Pat. application Ser. No. 698,217 filed Jan. 16, 1968, now Pat. No. 3,507,349 and assigned to the assignee of the present invention.

Objects of the Present Invention

It is therefore a principal object of the present invention to provide a vehicle control system in which a plurality of automated or semi-automated vehicles are simultaneously controlled from one or more stationary control stations.

Another object of the present invention is to provide a vehicle control system including a low power radio communication system which is not subject to transmission interferences normally encountered in prior art vehicle intercommunication systems.

Still another object of the present invention is to provide a vehicle control system including a communication system for supplying electronic control data to a plurality of warehouse vehicles or the like, which is highly reliable and will not cause radio interference with other transmission systems in the vicinity.

Still another object of the present invention is to provide a vehicular communication system including a distributed antenna network which is arrayed to coincide with the paths of travel of one or more controllable vehicles.

Summary of the Invention

Briefly, the present invention includes a guidance conductor disposed along one or more vehicle paths for developing magnetic guidance fields, a transmission line disposed along the vehicle path, a stationary control unit coupled to the transmission line and a mobile control unit which uses the magnetic guidance field as a means of guiding the vehicle along the vehicle paths, and through electro-magnetic induction, uses the transmission line as a means of communicating control data and response data to the stationary control unit.

In accordance with the present invention, any number of vehicular units can be simultaneously controlled from a stationary central control station and can transmit back thereto any requested verifying data or other communicative information.

A principal advantage of the present invention is that due to the inherent nature of the disclosed distributed antenna system, the communicative data radiated therefrom is substantially limited to the paths over which the intended receiving vehicles are to pass.

Another advantage of the present invention is that since the radiation from the distributed antenna array is localized within the vehicular thoroughfares it can be received through antenna structures appropriately mounted on the vehicles and carried at short distances from the array so that the transmission path is, under normal conditions, never subject to interference.

Still other advantages of the present invention will become apparent to those skilled in the art after having read the following disclosure of preferred embodiments, which are illustrated in the several figures of the drawing.

IN THE DRAWING

FIG. 1 is a schematic illustration of a warehouse vehicle control system in accordance with the present invention.

FIG. 2 is a cross-sectional illustration showing the manner in which the guidance line and transmission line of the system shown in FIG. 1 are disposed beneath the vehicle pathway.

DESCRIPTION OF THE PREFERRED EMBODIMENTS

Figure 3:
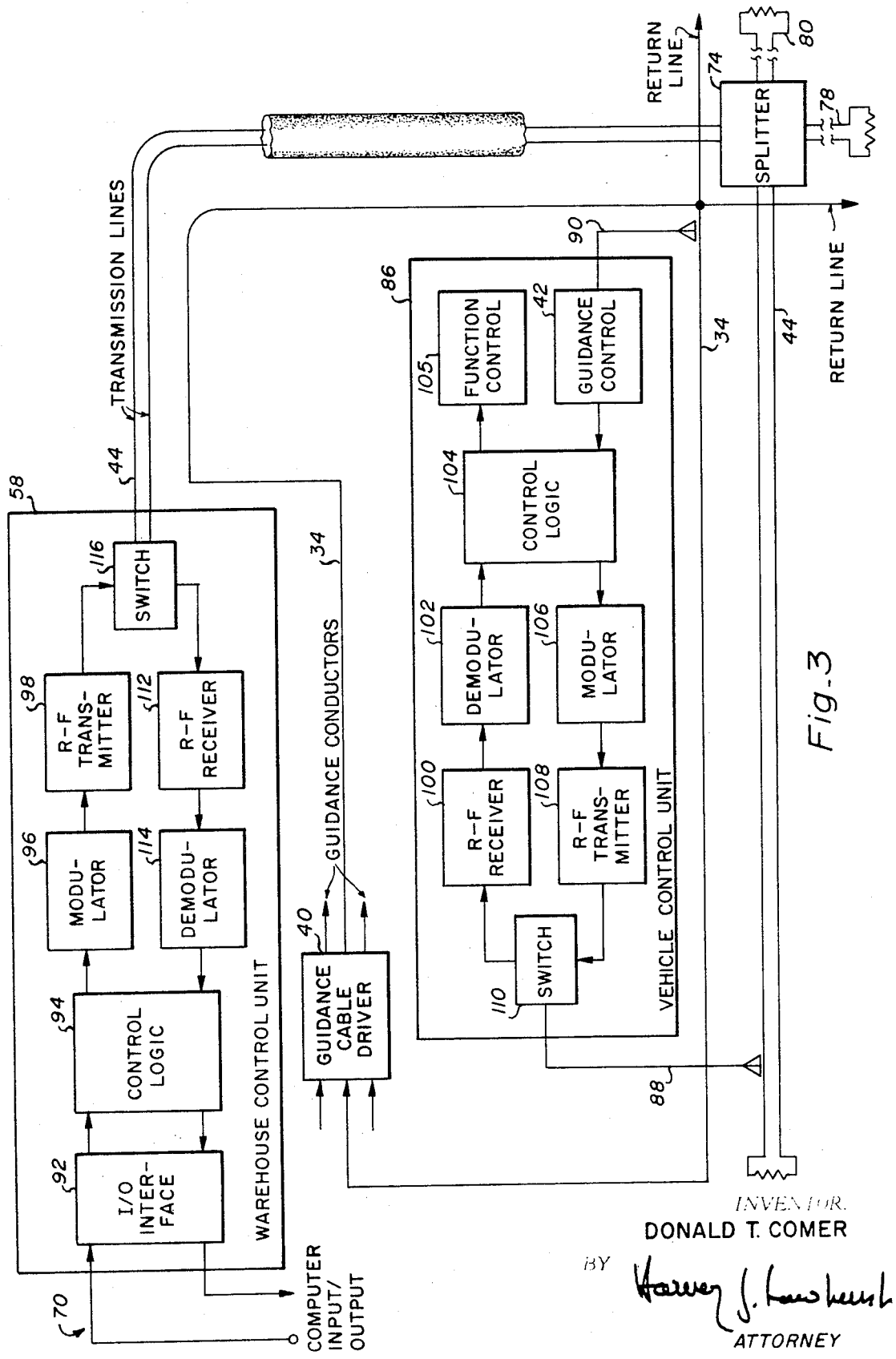
FIG. 3 is a schematic block diagram illustrating the essential components of a communication system in accordance with the present invention.

Referring now to FIG. 1 of the drawing, an illustrative example of a warehouse layout is shown including guidance and communication means for directing and controlling one or more warehousing vehicles. The schematic illustration depicts a basic warehousing floor arrangement wherein a plurality of bins 10 are disposed in spaced apart relation to form a plurality of bin rows and columns with main aisles 12, 14 and 16 and bin aisles 18 through 28 for allowing access to the respective bins.

Disposed within the floor of the various aisles, and beneath the paths to be followed by the warehousing vehicles illustrated at 30 and 32, is a first guidance conductor 34 for developing a magnetic field thereabout for use in providing vehicle guidance in the main aisles 12, 14 and 16, a second guidance conductor 36 for developing a magnetic field thereabout which is used to provide vehicle guidance through the left bay of bin aisles 18 through 28, and a third guidance conductor 38 for developing a magnetic field thereabouts which is used to provide vehicle guidance through the right bay of bin aisles 18 through 28.

Each of the guidance conductors 34, 36, and 38 are energized with guidance signals developed by the guidance cable driver 40. The guidance signals are typically low frequency AC signals of frequencies $F(a)$, $F(b)$ and $F(C)$ respectively. With the conductors 34, 36, and 38 so energized, a time varying magnetic guidance field is created about the respective conductors which can be sensed by suitable magnetic detection apparatus comprising a part of the guidance control means 42 carried on board the warehouse vehicles. A preferred form of such a guidance means is disclosed in the previously referred to U.S. Pat. application Ser. No. 698,217.

In accordance with the guidance system illustrated in the present drawing, which may be considered as extension of that illustrated in the aforementioned copending applications, a vehicle can be electrically caused to direct itself to any desired position adjacent any of the bins 10 for enabling extraction or deposition of any articles, stored or to be stored therein in the respective bins 10.

Because of the differences in frequency of the signals used in main aisle guidance conductors 34 and the bin aisle guidance conductors 36 and 38, frequency selective circuits in the guidance control means 42 in the vehicle control unit can be used to develop control signals for diverting the vehicle from the main aisles 12, 14, or 16 to any of the bin aisles 18 through 28 and visa versa. This may be accomplished in a highly accurate efficient manner by the method and apparatus disclosed in the above mentioned copending application.

Although it is also possible to supply control data to the vehicles through modulation of the guidance conductors, this has been found to be an unsuitable method for a multi-vehicle system because of the limited information rate which can be achieved by modulating a low frequency carrier (the guidance signal).

In accordance with the present invention, an array of twin lead conductors is provided beneath the intended path of the warehouse vehicles for conducting low power communications signals developed by a warehouse control unit (WCU) 58. These signals cause lower power electromagnetic communication fields to be developed in the immediate vicinity of the conductors which can be detected by suitable receiver means forming a part of the vehicle units (VCU) carried on board the respective vehicles. Once detected, the control signals can then be used to cause the vehicle to procede to selected positions within the warehouse and to perform any number of desired functions. As illustrated in FIG. 1, a trunk line 44 is extended extended along the bin aisle 18 past main aisles 12 and 14, and then turned to continue down the main aisle 16 where it is terminated. At point 46 a suitable transmission line splitter is provided for coupling a line 51 to trunk line 44. Line 51 extends down the main aisle 12. Similarly, a second splitter is used at 50 to couple a line 52 to line 44. Line 52 extends down main aisle 14. In order to provide transmission lines in each of the bin aisles 20 through 28, a plurality of branch lines 54 and 56 are splitter-coupled to line 52 and extended along the respective bin aisles as indicated.

These transmission lines are, in a preferred form, high quality twin lead plastic jacketed conductors which are terminated at their distal ends in suitable impedances. In this form the array of interconnected twin lead transmission lines form a distributed antenna system which permits intercommunication between the warehouse control unit 58 and the vehicles 30 and 32. When energized with communication signals, transmission line 44 develops an electro-magnetic communication field which can be detected by a suitable electro-magnetic energy sensing device. The respective sections of transmission line are typically integrated within the concrete or asphalt floor slab of a given warehouse during initial construction or are provided in grooves or channels subsequently cut therein which may be subsequently filled to floor level to provide a smooth floor surface.

In one embodiment, such as illustrated in FIG. 2, the twin lead transmission line 44 is disposed in the same channel or groove 62 cut in the floor 64 which is occupied by the guidance line conductor 34. Once the conductors 34 and 44 have been suitably positioned within the channel 62, the channel is filled with a suitable filler material 68 to provide a smooth warehouse floor with the conductors concealed therein.

The controlled vehicles 30 and 32 carry suitable antenna or other electro-magnetic energy sensing devices 88 and 90 which are positioned near the floor 64 for sensing the energy radiated from the conductors 34 and 44. The antenna 90, for example, is coupled to the guidance control means 42 and is capable of sensing the magnetic guidance field created around the guidance cable 34 so that vehicle 30 may be caused to follow a selected path. The antenna 88 is positioned to receive electro-magnetic energy radiated from the twin lead conductor 44 in response to the communicative data transmitted by the warehouse control unit 58. Similarly the antenna 88 can be used to radiate communicative energy back into the line 44 for sending return information to the warehouse control unit.

Turning now to FIG. 3 of the drawing, a more detailed block diagram is provided to schematically illustrate certain operative components of the present invention. Like members in FIGS. 1, 2 and 3 refer to like components. As was illustrated more generally in FIG. 1, the warehouse control unit 58, which is responsive to a computer input at 70, is coupled to the transmission line 44 which is in turn coupled through splitters 74 into branches which extend along the various aisles of the warehouse. The warehouse vehicles 30 and 32 (FIG. 1) each carry a vehicle control unit 86 which is communicatively coupled to the warehouse control unit through the transmission line 44.

Also extending along side the transmission lines 44, etc., and within the same aisles are guidance lines conductors 34 which are energized by the guidance cable driver 40. The guidance field created around conductor 34 is detected by the antenna 90 which in turn develops an electrical signal to which the guidance control system responds to develop appropriate control signals for guiding the vehicle along a selected path. Warehouse control unit (WCU) 58 includes an input-output interface 92, control logic 94, a modulator 96, an rf transmitter 98, a switch 116, an rf receiver 112 and a demodulator 114, all of which are of conventional construction.

In general, the WCU 58 has three main functions. First, it uses interface 92 for coupling certain control logic 94 to the input/output (I/O) channel of a computer. This gives the WCU the ability to exchange digital information directly with the computer. In this respect, the WCU resembles any other I/O device connected to a computer.

Secondly, by means of control logic 94, it stores and shifts digital information transmitted to and from one or more vehicles, regulates the timing and data rates of transmitted and received information, and decodes appropriate digital words received from the computer or vehicles.

The third function of the WCU is the actual RF transmission and reception of information. RF transmission of data by the WCU may be accomplished in the following manner: The external computer sends a given input command signal in the form of one or more digital (binary) words to the WCU 58. The binary words, after receipt by interface 92, are passed to control logic 94 for storage in a data register which permits a later checking operation and are simultaneously placed in a serial shift register. The control logic 94 then shifts the data out of the serial shift register into modulator 96 and RF transmitter 98 in a serial mode.

An RF signal is then modulated in modulator 96 by the binary value of the highest order signal in the shift register and is thence transmitted over the terminated RF transmission line 44 which is arrayed in the floor throughout the warehouse as illustrated in FIG. 1. It should be noted that the system is not restricted to a serial mode of transmission. The serial mode is merely chosen as being preferred because of the smaller band width required and the smaller degree of complexity required for modulation.

As was mentioned above, the transmission line 44, is utilized as a distributed antenna which runs throughout the warehouse and parallels the possible paths of the mobile vehicles under guidance control by the guidance control system 42. Since the transmission line 44 is terminated in its characteristic impedance, there is little radiation a few feet away from the transmission line. However, signals picked up a few inches from the line will be much greater than normally required for an RF receiver. By utilizing an automatic gain control circuit in the system receivers, it has been found that the vehicle antenna can actually be separated from the transmission line by as much as three feet without interruption of communication.

Each of the vehicles 30 and 32 respectively is equipped with an antenna 88 which is typically mounted near the floor and in a position which will follow the locus of the transmission line 44 as closely as possible. In a preferred design the vehicle antenna 88 is never allowed to stray more than a few inches from the transmission line so that the signal picked up thereby has a relatively high signal-to-noise ratio. This signal is amplified and demodulated in the receiver 100 and demodulator 102 respectively, of the vehicle control unit 86 and is then loaded into a data register of the control logic 104. Control logic 104 includes suitable conventional logic circuits and registers which respond to the communication signals input thereto via demodulator 102 and generate appropriate function control signals for driving the function control means 105 as well as developing guidance selection signals for input to guidance control means 42. The function control means schematically represented by block 105 include any of the various mechanical, electro-mechanical or other means required to carry out the intended operative functions of the vehicle. Normal error checking schemes such as parity checking, etc., may be used to insure the accuracy of the received data.

Since accuracy is of utmost importance, a retransmit/verify scheme is preferably employed in the system. In accordance with this scheme, once the VCU receives a signal, the vehicle transmits the same data back to the WCU for comparison. This is accomplished by use of the modulator 106 and RF transmitter 108 which are connected through the switch 110 to the vehicle antenna 88 the couple the transmitted energy back into the transmission line 44 for transmission back to the WCU 58.

The RF receiver 112 and demodulator 114 are opened to the transmission line 44 by the switch 116 to allow the retransmitted data to reach the control logic 94. If the data word does not compare bit by bit with the word originally sent by the WCU, then a check character is transmitted to the vehicle control unit 86 followed by re-transmission of the original data word. This insures the correct transmission of data to the vehicle control unit 86 and gives the computer a means of identifying faulty operation of a vehicle control unit.

Transmission of data from the control unit of vehicle 30 is accomplished in substantially the same manner as from the WCU except that the data is inductively coupled into transmission line 44. More specifically, an RF signal is developed in modulator 106 by the digital word to be transmitted and the word is fed out of control logic 104 in a serial mode to the vehicle antenna 88. Since the vehicle antenna is typically close to both the transmission line 44 and guidance conductor 34 either line could be employed as the return transmission medium to the receiver 112 of the warehouse control unit 58 but it is preferrable that line 44 be utilized. It should also be understood that as an alternative to the balanced termination of the transmission line 44, the remote end thereof could be returned directly to the receiver 112.

In the proposed system, data transmitted from the WCU 58 is intended for a particular vehicle alone. In order to accomplish segregation of the transmitted signals to the various vehicles, each vehicle is assigned an identification number (ID) such that when data is to be transmitted to a particular vehicle the WCU first transmitts the desired vehicle ID code. In accordance with "retransmit-verify" feature of the system, the vehicle will then transmit its own ID code back to the WCU. Upon receipt of the proper ID, the WCU is then assured that the proper vehicle is receiving the data. A given vehicle cannot use any of the data transmitted over the transmission line and will not retransmit data unless its particular ID code has first been received and properly decoded.

When the WCU has finished transmitting data to a particular vehicle, the last word sent to the vehicle is an end of transmission (EOT) character. This character resets the decoder of the vehicle ID section (in control logic 104) and the vehicle will not accept further data from the WCU until its ID code is again received.

To eliminate interference from different vehicles transmitting data to the WCU, a particular vehicle is allowed to transmit back to the WCU only immediately after the WCU has transmitted data to that vehicle, i.e., following receipt of the EOT character. The vehicle, therefore, will transmit data from the "retransmit-verify" operation only when it has properly decoded its ID code. In addition, the vehicle may transmit new data such as status conditions to the WCU only after the WCU has finished a transmission to that vehicle and requested information. The EOT character, therefore, has two functions, First, it signifies to the vehicle receiving data from the WCU that new data may be transmitted back to the WCU, and secondly it resets the ID decode for that vehicle.

Generally, then, the WCU should be programmed to serially poll all of the vehicles on line to determine which vehicles have information to transmit back thereto. The polling operation may only consist of sending a vehicle ID, verifying the retransmitted ID, listening for any new data transmitted by the vehicle and then sending an EOT code, verifying the retransmitted EOT code, and the WCU then increments the ID code to be transmitted and continues the polling operation.

Although the above disclosure has been primarily directed to rolling warehousing vehicles, it is contemplated that the system will have equal utility and application to any type of vehicle system wherein the vehicles are constrained to travel over predetermined paths. For example, the system will have great utility for systems which ride above a roadway or other passageways on a cushion of air since no physical contact of any kind is required between the vehicle and the communication medium. Furthermore, the position of the distributed antenna array is not to be limited to locations beneath the vehicles since in the case of tunneled structures such as subways, etc., the members of the distributed array could just as well be located in or on the ceiling or walls of the passage forming means.

It is contemplated that after having read the above disclosures many alterations and modifications of the present invention will become apparent to those of skill in the art. It is therefore to be understood that the particular embodiments disclosed are for illustrative purposes only and are not to be considered limiting to that extent. I, therefore, intend that the appended claims be interpreted as covering all such additions and modifications which fall within the true spirit and scope of the invention.

What is claimed is:

1. A vehicle control system for controlling the operation of a warehousing vehicle and directing its movement over at least two intersecting vehicle paths, comprising:

a first guidance conductor disposed along one of said paths and a second guidance conductor disposed along the other of said paths;

means for electrically energizing said first and second conductors with signals of different frequencies to develop a first magnetic guidance field along said one path and a second magnetic guidance field along said other path;

a transmission line extending longitudinally along both said paths and operative to develop an electro-magnetic communication field along the length thereof when energized by a first communication signal, said transmission line being further operative to conduct a first response signal induced therein by an electro-magnetic response field;

a warehouse control unit including first control logic for developing said first communication signal and for receiving said first response signal; and a vehicle control unit carried by said vehicle including, a first transducer responsive to said communication field and operative to develop a second communication signal, said first transducer being additionally responsive to a second response signal and operative to develop said electro-magnetic response field, second control logic responsive to said second communication signal and operative to develop a function control signal, a path selection signal and said second response signal, function control means responsive to said function control signal and operative to control at least one function of said vehicle, a second transducer responsive to said magnetic guidance field and operative to develop guidance signals, and guidance means responsive to said guidance signals and said path selection signal and operative to guide said vehicle along a selected one of said paths.

2. A vehicle control system for controlling the operation of a warehousing vehicle and for directing its movement over at least two intersecting vehicle paths, comprising:

a guidance conductor disposed along and defining each of said intersecting vehicle paths and means for electrically energizing each guidance conductor with a signal of a different frequency to develop a different guidance field along each of said paths;

a transmission line extending longitudinally along each of said paths, said transmission line being operative to develop a communication field along the length thereof when energized by a communication signal, and being operative to be energized by a response signal induced therein by a response field developed along portions of the length thereof;

a warehouse control unit including control logic for developing said communication signal and for receiving said response signal; and a vehicle control unit carried by said vehicle including, receiver means responsive to said communication field and said guidance field and operative to develop guidance signals to guide said vehicle along a selected one of said paths, and transmitter means operative to develop said response field to communicate data to said warehouse control unit.

3. A vehicle control system in accordance with claim 2 in which said transmission line is of twin lead configuration.

4. A vehicle control system in accordance with claim 3 in which said twin lead transmission line is terminated into its characteristic impedance at its distal end.

* * * * *